(12) United States Patent
Hellenbrand (10) Patent No.: US 11,897,120 B2
(45) Date of Patent: *Feb. 13, 2024

(54) GRIPPER FOR PICKING DEVICE AND METHOD FOR OPERATING A PICKING DEVICE HAVING THIS GRIPPER

(71) Applicant: Becton Dickinson Rowa Germany GmbH, Kelberg (DE)

(72) Inventor: Christoph Hellenbrand, Kaifenheim (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 433 days.

This patent is subject to a terminal disclaimer.

(21) Appl. No.: 17/128,811

(22) Filed: Dec. 21, 2020

(65) Prior Publication Data

US 2022/0193921 A1     Jun. 23, 2022

(51) Int. Cl.
*B25J 15/00* (2006.01)
*B25J 9/16* (2006.01)
(Continued)

(52) U.S. Cl.
CPC ......... *B25J 15/0028* (2013.01); *B25J 9/1612* (2013.01); *B25J 9/1674* (2013.01); *B25J 13/088* (2013.01); *B25J 17/02* (2013.01)

(58) Field of Classification Search
CPC ................ B25J 15/0028; B25J 15/0014; B25J 15/0206; B25J 9/1612; B25J 9/1674;
(Continued)

(56) References Cited

U.S. PATENT DOCUMENTS 4,350,381 A * 9/1982 Hellmann ............ B25J 15/0009
                                            901/37
10,265,862 B1 * 4/2019 Alqasemi ............ B25J 15/0033
(Continued)

FOREIGN PATENT DOCUMENTS

DE    2530385 A1    1/1977
DE    3313754 A1    10/1984
(Continued)

OTHER PUBLICATIONS

Extended European Search Report for Application No. 20215874.7, dated May 21, 2021, 13 pages including machine translation.
(Continued)

*Primary Examiner* — Stephen A Vu
(74) *Attorney, Agent, or Firm* — Morgan, Lewis & Bockius LLP (57) ABSTRACT

A gripper for a picking device for storing small piece goods and a method for operating a picking device having a gripper are provided. The gripper simplifies dispensing and includes a drop table extending in first and second horizontal directions, and has at least one end portion having a dispensing end face, wherein the drop table and the end portion define an upper support surface. A transport device for moving small piece goods is arranged above the drop table and sensor device(s) are arranged in the at least one end portion having detection regions associated therewith, the sensor device being arranged along a vertical axis in such a way that the detection regions cover a vertically extending space in front of the dispensing end face.

20 Claims, 7 Drawing Sheets

(51) Int. Cl.
*B25J 17/02* (2006.01)
*B25J 13/08* (2006.01)

(58) Field of Classification Search
CPC ........ B25J 9/1694; B25J 9/1679; B25J 9/021; B25J 13/088; B25J 17/02; B25J 19/02; G05B 2219/4505
See application file for complete search history.

(56) References Cited

U.S. PATENT DOCUMENTS

| | | | |
|---|---|---|---|
| 11,319,150 B2* | 5/2022 | Schmidt-Ellinger | ........................ G07F 17/0092 |
| 2018/0111757 A1 | 4/2018 | Abe et al. | |
| 2019/0022855 A1* | 1/2019 | Hellenbrand | ........ B25J 15/0213 |
| 2020/0063919 A1* | 2/2020 | Nicolas | .................... F17D 5/06 |

FOREIGN PATENT DOCUMENTS

| | | |
|---|---|---|
| EP | 2620391 A1 | 7/2013 |
| JP | S53153689 U | 12/1978 |
| WO | WO-2019015815 A1 | 1/2019 |

OTHER PUBLICATIONS

European Office Action for Application No. 20215874.7, dated Jun. 29, 2023, 8 pages including translation.
Extended European Search Report for Application No. 20153879.0, dated Nov. 6, 2020, 17 pages.
International Search Report and Written Opinion for Application No. PCT/EP2021/051196, dated Apr. 9, 2021, 25 pages including translation.
International Search Report and Written Opinion for Application No. PCT/EP2021/081175, dated Feb. 2, 2022, 21 pages including translation.
Second Extended European Search Report for Application No. 20153879.0, dated Feb. 19, 2021, 19 pages including translation.

* cited by examiner

GRIPPER FOR PICKING DEVICE AND METHOD FOR OPERATING A PICKING DEVICE HAVING THIS GRIPPER

BACKGROUND

The present disclosure relates to a gripper for a picking device with horizontal shelves for storing small piece goods, in particular pharmaceutical packages and food supplement packages, and a method for operating a picking device having a gripper according to the disclosure.

SUMMARY

One or more embodiments provide a gripper for a picking device having horizontal shelves for storing small piece goods. The gripper includes a drop table extending in a first horizontal direction and a second horizontal direction orthogonal to the first horizontal direction, the drop table comprising an end portion having a dispensing end face, wherein the drop table and the end portion define an upper support surface. The gripper also includes a transport device arranged above the drop table and movable in the first horizontal direction, the transport device configured for moving small piece goods from a horizontal shelf to the drop table. The gripper further includes a control device and a sensor device coupled to the control device. The sensor device is arranged in the end portion, the end portion having a plurality of detection regions associated therewith, wherein the sensor device is arranged along a vertical axis in such a way that the plurality of detection regions cover a vertically extending space in front of the dispensing end face, and wherein the control device is configured to determine the alignment of the gripper on a horizontal shelf by evaluating the sensor device.

One or more embodiments provide a method for operating a picking device. The method includes moving a gripper to a specified target position in front of a specified shelf of a plurality of horizontal shelves. The gripper includes a transport device for storing and dispensing small piece goods on or from the shelves; a drop table extending in a first horizontal direction and a second horizontal direction orthogonal to the first horizontal direction and having at least one end portion with a dispensing end face, the drop table and the end portion defining an upper support surface; and at least one sensor device coupled to a control device and arranged in the at least one end portion having detection regions associated therewith, wherein the sensor device is arranged in such a way that the detection regions cover a vertically extending space in front of the dispensing end face. The method also includes determining a current alignment of the gripper in relation to the specified shelf by checking in which detection regions the presence of the shelf is recognized. The method further includes determining whether the current alignment of the gripper on the specified shelf in relation to a vertical position corresponds to a specified alignment. The method also includes moving the gripper in a vertical direction according to a negative or positive deviation between the current alignment and the specified alignment when the current alignment is determined not to be in the specified alignment.

The foregoing and other features, aspects and advantages of the disclosed embodiments will become more apparent from the following detailed description and accompanying drawings.

BRIEF DESCRIPTION OF THE DRAWINGS

In the following, one or more embodiments of the gripper according to the disclosure and one or more embodiments of the method according to the disclosure shall be described with reference to the drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In modern picking devices, as they are often used in pharmacies, a large number of different and differently dimensioned pharmaceutical packages or food supplement packages is stored chaotically and space-optimized on elongated horizontal shelves. Together with the shelf walls, these form a plurality of shelf compartments, a large number of small piece goods being stored per shelf compartment or shelf.

With space-optimized storage, small piece goods, such as pharmaceutical packages and food supplement packages, are stored on shelves in such a way that the largest possible number of small piece goods can be stored per unit area of a shelf, i.e., in such a way that as little free space as possible remains on a shelf. In the usual chaotic, space-optimized storage, however, it is not ensured that the small piece goods are stored in the picking device in such a way that the weight is evenly distributed between the individual shelves. It follows from this that it may well happen that a plurality of relatively "heavy" small piece goods is stored on a shelf. The shelves are usually made of a thin material with a smooth surface. In picking devices such as those used in pharmacies, shelves made of glass are often used. Depending on the width of a shelf and its occupancy, the shelves may be deflected, especially in the middle of a shelf compartment, which means that the small piece goods stored on the deflected shelves and the shelves themselves are not arranged in the Z position (the Z axis is the vertical axis), where this is "expected." Depending on the degree of deflection, shelves and the small piece goods arranged thereon are "deeper," which corresponds to a lower Z position.

In order to be able to dispense packages from a picking device as quickly as possible (in the following the term "packages" is used as a synonym for in particular pharmaceutical packages and food supplement packages and generally small piece goods), the shelves on which they are stored are assigned target positions which are approached by a gripper when a package is to be dispensed from a shelf or shelf compartment. When dispensing a package from storage, it is gripped by a transport device and moved onto a drop table of the gripper. In order to be able to do this without the package getting stuck between a necessary gap between the loading and unloading end face of the gripper and the corresponding end face of the shelf, the gripper is moved so that the surface of the drop table and the surface of the shelf are approximately in the same Z position (assuming a shelf that is not bent).

If a package is to be moved from a shelf to a drop table, it is non-hazardous if the Z position of the surface of the drop table of the gripper is slightly below the Z position of the surface of the shelf. If, on the other hand, a package is to be moved from the drop table of a gripper to a shelf, it is non-hazardous if the shelf is arranged in a slightly lower Z position.

However, if a plurality of relatively heavy packages is stored on a shelf, it can happen that this shelf is deflected in such a way that in a situation in which a package is to be moved from a shelf to the drop table, the current or true Z position of the surface of the shelf is well below the Z position of the surface of the drop table of the gripper. If in such a situation, an attempt is made to move a package from the shelf to the gripper, the package remains hanging on the front edge of the drop table, which in this situation projects well beyond the surface of the shelf. With the known grippers, a package cannot be moved onto the drop table without adjusting the gripper with respect to the Z position. With the known grippers, however, an adjustment of the Z position can only be triggered by adjusting it in response to the unsuccessful dispensing of a package.

It is the object of the present disclosure to provide a gripper with which a misalignment between the shelf and the gripper can be determined before carrying out a storage or dispensing movement. It is also an object of the disclosure to provide a method for operating a picking device having a corresponding gripper.

The object is achieved according to the disclosure by a gripper for a picking device having horizontal shelves for storing small piece goods according to claim 1. The gripper according to the disclosure comprises a drop table extending in a first horizontal direction (X direction) and a second horizontal direction (Y direction) which is orthogonal to the first horizontal direction, having at least one end portion with a dispensing and storage end face, wherein the drop table and the end portion define an upper support surface, a transport device arranged above the drop table and movable in the first horizontal direction for moving small piece goods from a horizontal shelf to the drop table, and at least one sensor device coupled to a control device and arranged in the at least one end portion having detection regions $DBx$ associated therewith, wherein the sensor device is arranged along a vertical Z direction in such a way that the detection regions $DBx$ cover a vertically extending space $DB1$-$DBn$ in front of the dispensing end face and wherein the control device is designed in such a way that the alignment of the gripper to a horizontal shelf can be determined by evaluating the sensor device.

By providing a conventional gripper for a picking device with at least one sensor device with a plurality of detection regions $DBx$ extending along a Z axis in the at least one end portion, it is possible to determine, prior to storing or dispensing a small piece good from a shelf to the drop table or from the drop table to a shelf, whether the alignment of the gripper on a corresponding shelf is such that there is only such an offset between the support surface of the drop table and the support surface of the shelf that does not impair the movement of a small piece good. By evaluating the plurality of the detection regions, it can be determined exactly into which of the detection regions the shelf extends. For example, a plurality of dedicated sensor units $SEx$ which are arranged so as to be vertically offset can be used as the sensor device, each of which has its "own" detection region. For this purpose, a sensor having a laser diode can be used, for example, which also includes receiving optics with which parts of the laser light that are thrown back or scattered from a surface of a shelf can be detected. By using a plurality of vertically offset sensor units with associated detection regions, the relative position of the shelf to the gripper can be determined.

Alternatively, for example, a matrix sensor having a plurality of sensor units, each with an assigned detection region, can be used. The term "sensor device" is also intended to include a camera, wherein for the determination of the alignment the image determined thereof is split into a plurality of "artificial" detection regions by a control device.

Depending on the number and possibly height of the detection regions, it is conceivable, for example, that an error-free movement of a piece good from the support surface of a shelf to the support surface of the drop table is only possible in the event that a shelf is determined, for example in the second detection region from above. If, for example, the shelf is determined in a detection region below the "ideal" detection region, this means that the shelf is deflected and a faultless movement of a piece good on the drop table is not guaranteed. In such a case, the gripper is lowered by a corresponding Z amount and then dispensing is carried out.

With the gripper according to the disclosure having a sensor device with the plurality of detection regions in the at least one end region of the gripper, it is therefore possible to determine, even before a storage or dispensing operation is carried out, whether this can potentially be carried out without errors, or whether a potential offset between the support surfaces of the shelf and the drop table can be corrected by adjusting the Z position of the gripper. Such an offset is not always disruptive; when moving small piece goods onto a shelf, the surface of the shelf can be arranged slightly below the support surface of the drop table without this interfering with the movement of the package from the drop table to the shelf. When a package is moved onto the drop table, it does not interfere with the movement, if the drop table is arranged slightly lower than the shelf.

In contrast to the case with known grippers, storage or dispensing is not attempted first and the gripper position is corrected in the event of incorrect storage or dispensing, but any offset that may be present is recognized immediately and corrected if necessary. Since the recognition of the offset can be carried out immediately after moving to the target position of the gripper within a very short time, the gripper according to the disclosure makes it possible to store and dispense small piece goods more quickly and with fewer incorrect movements.

Another advantage of the disclosure is that known grippers can be adjusted inexpensively and without great effort by installing a correspondingly designed sensor device. The disclosure can be used with grippers that dispense and store the small piece goods over only one end region, but also with those whose drop tables have two end regions, via which they are dispensed and stored. In the latter case, it is then sensible (but not absolutely necessary) to provide a sensor device in both end regions. In the following, only one sensor device is referred to, but corresponding statements also apply when two sensor devices are installed.

Which transport device is used for moving small piece goods in the gripper according to the disclosure is not substantial for the disclosure. For example, transport devices can be used that grip a small piece good from behind and then pull it from the shelf to the drop table of the gripper. In one or more embodiments, which is structurally very simple, it is provided that the transport device comprises two elongated gripping jaws arranged above the drop table and extending in the X direction with inner surfaces facing each other, wherein at least one of the gripping jaws is additionally movable at least in portions in the second horizontal direction. Optionally, at least one of the gripping jaws can also be pivoted.

In order to be able to restore the functionality of the gripper quickly and easily in the event of a faulty sensor device, it is provided in one or more embodiments of the gripper that the sensor device is designed as a sensor assembly which is releasable from the drop table.

Usually, the gripper is positioned on a shelf in such a way that the small piece good to be dispensed or stored is arranged centrally with regard to the drop table or the future drop location on the shelf. For this reason, it is provided in one or more embodiments that the sensor unit is arranged centrally in the end portion in relation to the Y direction. This ensures that always the "average" deviation between the surface of the shelf and the support surface of the drop table is detected by means of the sensor units (if any). In the case of very wide grippers, it is also conceivable that a plurality of sensor units are distributed over the entire width (in the Y direction).

In the event that the sensor device is only intended to determine a deflection of a shelf, i.e., only for the case that the shelf is "below" the expected position, it is sufficient that the detection regions extend below the level of the support surface of the drop table. However, depending on the method, which is described in more detail below, it is also conceivable that the target position assigned to a shelf is adjusted with regard to the Z position as soon as a deflection of a shelf is detected. In this way, it can be achieved that the target position of a shelf is optimally approached the next time it is dispensed or stored, without a subsequent adjustment with regard to the Z position being necessary.

However, dispensing a small piece good from storage (or possibly necessary manual removal of one or more small piece goods) can also have the effect of reducing the deflection of a shelf, i.e., the Z position of the shelf approaches the original Z position again. If the method for operating the picking device is operated in such a way that an adjustment of the target position for a specified shelf takes place, one or more embodiments of the gripper provides for the sensor device to be arranged such that at least one detection region DBx extends vertically over the support surface.

The object is further achieved by a method for operating a picking device according to claim 6. The picking device used to carry out the method comprises a plurality of horizontal shelves, at least one gripper that can be moved in front of the horizontal shelves, wherein this gripper comprises a transport device for storing and dispensing small piece goods on or from the shelves, a drop table which extends in a first horizontal direction and a second horizontal direction which is orthogonal to the first horizontal direction and has at least one end portion having a dispensing end face, wherein the drop table and the at least one end portion define an upper support surface, and comprises at least one sensor device coupled to a control device and arranged in the at least one end portion having detection regions DBx associated therewith, wherein the sensor device is arranged in such a way that the detection regions DBx cover a vertically extending space in front of the dispensing end face.

According to the disclosure, the gripper is moved into a target position SPx assigned to a shelf RBx. A small piece good which is to be moved onto the drop table can be arranged on this specified shelf. Alternatively, a small piece good, which is to be moved onto the specified shelf can be arranged on the drop table. As already explained above, due to a possible deflection of a shelf it can happen that the support surface of the drop table is not aligned with the support surface of the shelf at the target position, so that it is not guaranteed that a small piece good is movable from the shelf to the drop table by means of the transport device, because an edge, which inhibits the movement can be formed due to the deflection of the shelf.

According to the disclosure, a current alignment of the gripper with respect to the specified shelf RBx is therefore determined before moving a small piece good by checking in which detection region(s) DBx the presence of the shelf is recognized. Based on the detection regions in which the presence of the shelf is recognized, it is determined whether the current alignment of the gripper on the specified shelf RBx in relation to the Z position (wherein this position corresponds to the target position SPx) corresponds to a specified alignment. This means that it is determined whether the support surface of the support table is aligned with the support surface of the shelf in such a way that a faultless movement of a small piece good is possible. How exactly this is carried out in detail is set out in the detailed description of one or more embodiments of the method.

If it is determined that the current alignment of the gripper in relation to the Z position does not correspond to a specified alignment, (i.e., the Z position of the support surface of the shelf is above or below the Z position of the support surface of the drop table), the gripper is moved in the Z direction according to a negative or positive deviation between the current alignment AA and the specified alignment VA.

In the event that the shelf is deflected due to being filled with small piece goods, this means that when determining whether the current alignment of the gripper on the specified shelf in relation to the Z position corresponds to a specified alignment, a "negative deviation" is detected, so that the gripper is moved "down" in the Z direction by the amount of the negative deviation determined in order to align the gripper with the deflected shelf. As soon as this has happened, a small piece good can be dispensed (in this case). Whether a "negative deviation" represents a downward or upward deviation depends on the designation or numbering of the Z axis. The lowest Z position usually corresponds to the 0 position.

With the method according to the disclosure, it is possible to determine already before a small piece good is moved from or onto a shelf whether this movement can potentially be carried out without errors. This determination can be carried out very quickly, so that in the event that there is an intolerable deviation, the gripper can be repositioned quickly. However, in order to largely avoid repositioning the gripper (and assuming that the removal of only one small piece good does not substantially affect the deflection of a shelf), one or more embodiments of the method provides that if there is a deviation between the current alignment AA and the specified alignment VA, the target position SPx to a specified shelf RBx is adjusted on the basis of the negative or positive deviation. In such a case, when the same shelf is approached again, the gripper is immediately moved to the adjusted target position SPx, whereby it can then be assumed that when checking whether the current alignment of the gripper on the specified shelf in relation to the Z position corresponds to a specified alignment, this determination or test is positive.

Deflection of a shelf is generally not desired, as it increases the risk of incorrect dispensing and storage. Depending on the material of a shelf, deflection over a longer period of time can also cause the material of the shelf to be damaged or the shelf to remain permanently deflected. In one or more embodiments of the method according to the disclosure, it is therefore provided that if there is a negative deviation between the current alignment AA and the specified alignment VA, the specified shelf RBx is marked as a shelf to be relocated. The shelf marked as to be relocated can then, when the picking device is not operated in regular operation, be dispensed or relocated in order to counteract the deflection of the regular shelf.

The deflection of a shelf not only prevents problem-free dispensing of a small piece good; the maximum storage height for a storage place below the specified shelf is also reduced. In one or more embodiments of the method, if there is a deviation between the current alignment AA and the specified alignment VA, the deviation is used for the adjustment of a maximum storage height of a shelf below the shelf currently being approached.

A shelf is regularly so wide (in the Y direction) that there is a large number of storage locations per shelf. However, the deflection affects not only a partial region of a shelf, but regularly all storage locations per shelf, with the middle storage locations being more heavily affected. In order to minimize the approach of target positions "with deviation" in a shelf, one or more embodiments provides that if there is a deviation between the current alignment AA and the specified alignment VA, the entire specified shelf RBx is traversed with the gripper in the Y direction and for all of the storage locations assigned to the specified shelf RBx the deviation between the current alignment AA and the specified alignment is determined and the target positions assigned to the storage locations are adjusted accordingly.

In an alternative embodiment, it is provided that if there is a deviation between the current alignment AA and the specified alignment VA on the basis of this deviation, the deviations for all storage locations on the shelf are calculated and the target positions assigned to the storage locations are adjusted accordingly. Although the calculation is not as accurate as the aforementioned traversing of the shelf in the Y direction, it saves a lot of time and is particularly useful when the picking device is in operation and traversing would interfere with dispensing and storage.

In a further preferred embodiment, it is also provided that the deviations determined between the current alignment and the specified alignment are used to adjust the maximum storage heights for all storage locations on the shelf below the specified shelf.

Figure 1A:
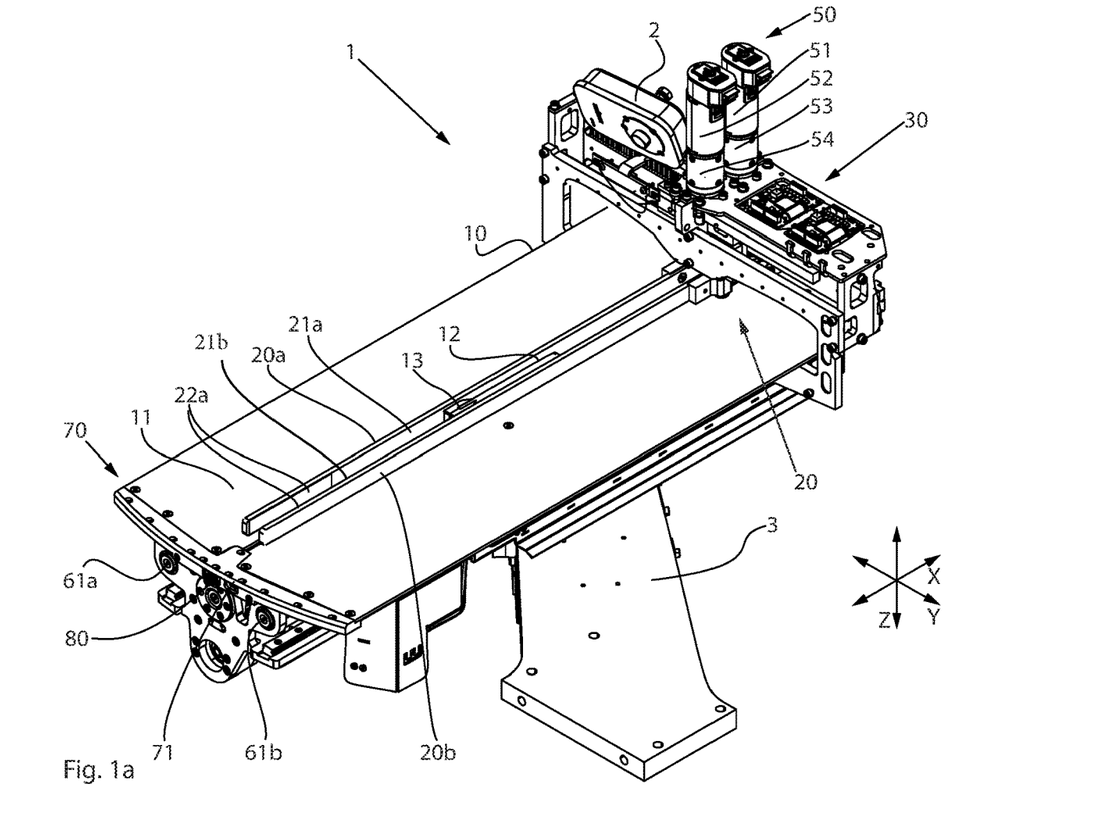
FIG. 1a is a perspective view of a gripper, according to aspects of the disclosure.
Figure 1B:
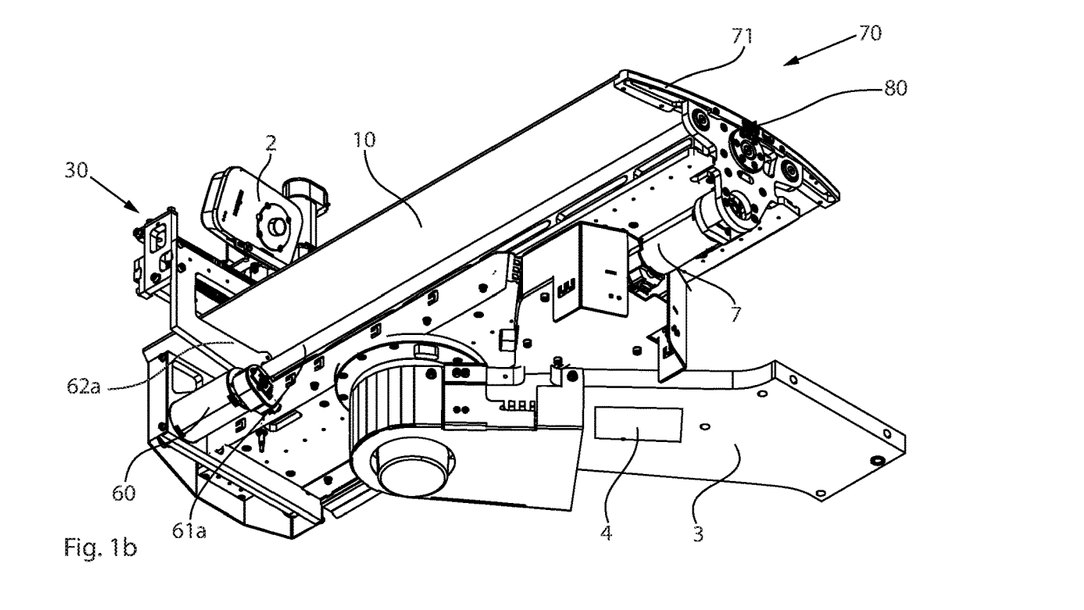
FIG. 1b is another perspective view of the gripper of FIG. 1a, according to aspects of the disclosure.

FIGS. 1a and 1b are two perspective views of one or more embodiments of a gripper 1 according to the disclosure, wherein FIG. 1a shows a perspective view from above and FIG. 1b shows a perspective view from below. The gripper 1 is part of an operating device (not shown) for a picking device and comprises a drop table 10 having an end portion 70 and a transport device 20, which comprises two clamping jaws 20a, 20b with opposing clamping surfaces 21a, 21b. At their free ends, the clamping jaws 20a, 20b have a portion 22a which is coated with a slip-resistant material.

At the free ends of the clamping jaws 20a, 20b, the drop table 10 includes the end portion 70 designed as a separate assembly and includes a sensor device designed as a sensor assembly 80 with a plurality of sensor units. The sensor assembly 80 is arranged below a support surface 11 defined by the drop table 10 and the end portion 70. The alignment of the gripper 1 on a shelf (not shown) can be determined with the sensor assembly 80, which is described in more detail in the following figures.

The end portion 70 comprises a storage and dispensing end face 71. Here, the end portion 70 is designed as a releasable assembly. In aspects of the disclosure, the "end portion" can also only identify a portion of the drop table 10. The drop table 10 comprises an elongated opening in the middle, which extends in the storage and dispensing direction, i.e., in a first horizontal direction X. A sliding element 12 having a widened sliding head 13 is arranged in the opening. The sliding element 12 can be moved in the elongated opening in the storage and dispensing direction (e.g., the first horizontal direction X).

In aspects of the disclosure, a clamping jaw guide arrangement 30 is arranged opposite the end portion 70, with which the clamping jaws 20a, 20b are connected and which comprises a mechanism for moving and pivoting the clamping jaws 20a, 20b. In the upper portion, the clamping jaw guide arrangement 30 comprises a drive unit 50 with two drives 51, 52 and assigned gears 53, 54. In aspects of the disclosure, the clamping jaws 20a, 20b are moved and pivoted via these two drives 51, 52, as will be described in more detail with reference to the following figures. An optical detection device 2 is arranged on the clamping jaw guide arrangement 30 with which various aspects can be monitored during the storage and dispensing process.

The clamping jaw guide arrangement 30 and all of its electronic components are connected to a control device 4 arranged below a fastening arm 3. The fastening arm 3 itself is fastened to the drop table 10 or to a substructure of the drop table 10 via a rotary joint.

For the storage and dispensing of packages, the clamping jaw guide arrangement 30 must be moved in the first horizontal direction X (e.g., the storage and dispensing direction). For this purpose, a drive 60 is arranged below the drop table 10. The drive 60 is coupled via a gear to a linear drive 61a, 62a, by which the clamping jaw guide arrangement 30 is moved in the first horizontal direction X. A drive 7, which drives the sliding element 12, is also arranged under the drop table 10.

Figure 2A:
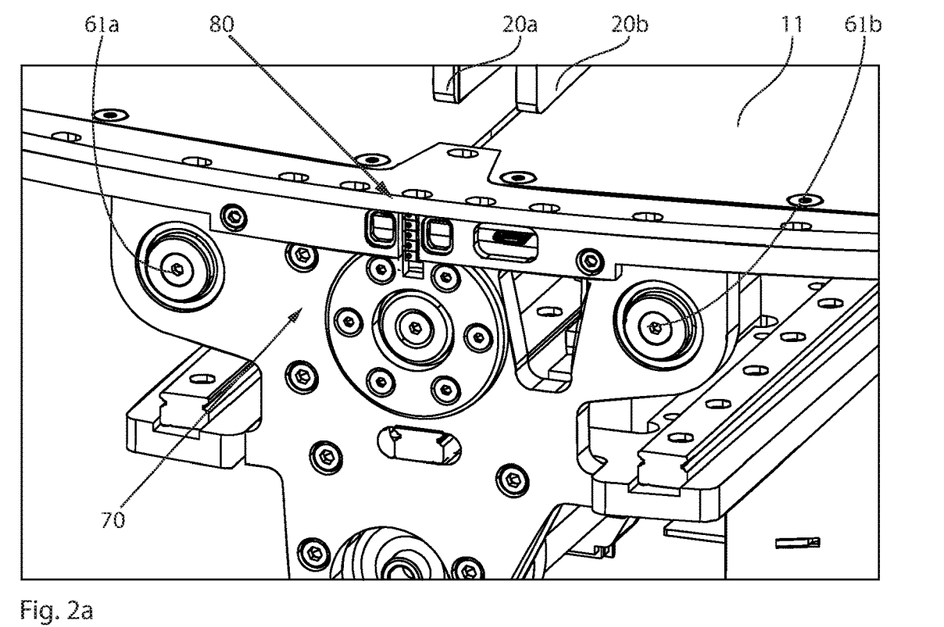
FIG. 2a is a perspective view of an end portion of a drop table of the gripper of FIG. 1a, according to aspects of the disclosure.
Figure 2B:
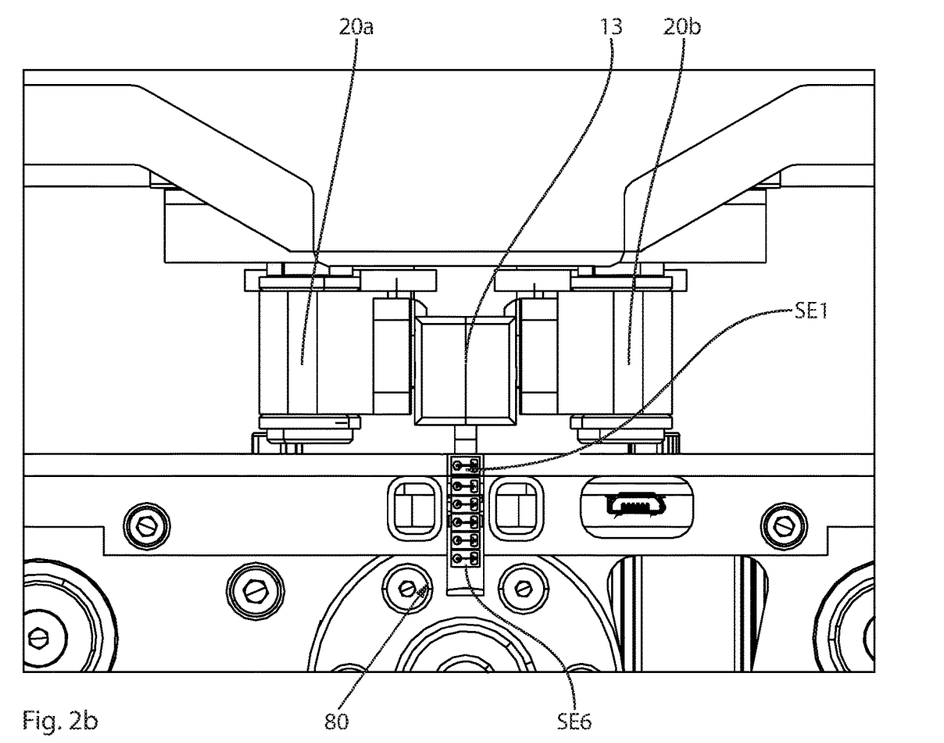
FIG. 2b is a front view of the gripper of FIG. 2a, according to aspects of the disclosure.

FIGS. 2a and 2b are detailed views of the end portion of the drop table 10 of the gripper 1 according to aspects of the disclosure, FIG. 2a showing a perspective view and FIG. 2b showing a front view. In FIGS. 2a and 2b, it can be seen more precisely that and how the sensor assembly 80 is arranged below the support surface 11 in the end portion 70 designed as a separate component. In FIG. 2b, it can be seen that the sensor assembly 80 in aspects of the disclosure may include six sensor units SE1-SE6.

Figure 3:
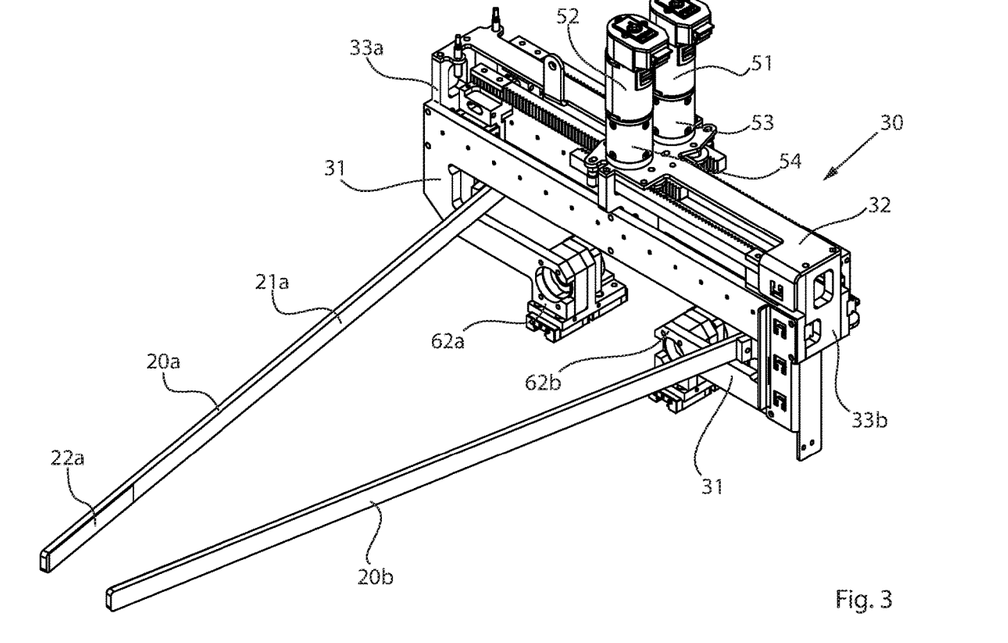
FIG. 3 is a perspective view of the gripper of FIG. 1a without the drop table and housing of a movement mechanism of a transport device, according to aspects of the disclosure.

FIG. 3 shows a perspective view of the clamping jaw guide arrangement 30 of the gripper 1 in one or more embodiments, in which both clamping jaws 20a, 20b are pivoted for gripping. The clamping jaw guide arrangement 30 comprises a frame structure having a front component 31, a top component 32, and side components 33a, 33b. The front component 31 engages around the clamping jaws 20a, 20b, and the drop table 10 (not shown). At the lower ends of the front component 31, movable parts 62a, 62b (e.g., the runners of a linear drive) are fastened, with which the clamping jaw guide arrangement 30 can be moved in the first horizontal direction X. The components are referred to as "moveable" because they move along with the clamping jaw guide arrangement 30 along corresponding fixed parts 61a, 61b, which are rotated to move the movable parts 62a, 62b in the first horizontal direction X. The fixed parts 61a, 61b (see FIGS. 1a, 1b) themselves can also move for moving the movable parts 62a, 62b, for example by rotating, with the movable parts 62a, 62b being moved along the longitudinal axis of the fixed parts 61a, 61b during this rotary movement, but any immovable parts are stationary based on the position in the gripper 1. In one or more embodiments, the fixed parts are designed as toothed belts which are designed between the longitudinal ends of the gripper 1 and interact with corresponding deflection rollers for moving the movable parts.

Figure 4A:
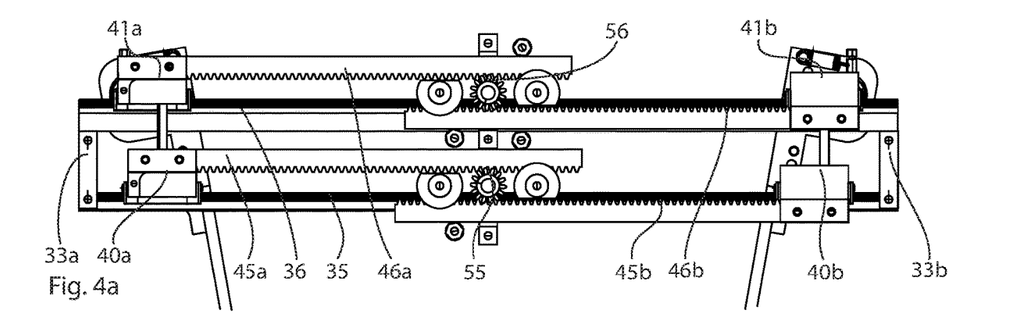
FIG. 4a is a top view of a movement mechanism of a transport device, according to aspects of the disclosure.

As can be seen from FIG. 4a, two guides, a first guide 35 and a second guide 36, extend between the side frame structure components 33a, 33b in a second horizontal direction Y parallel to one another and are spaced apart from one another in the first horizontal direction X, wherein the first guide 35 faces the free ends of the clamping jaws 20a, 20b. Two clamping jaw slides 40a, 40b; 41a, 41b are arranged on each of the guides 35, 36, two first clamping jaw slides 40a, 40b on the first guide 35 and two second clamping jaw slides 41a, 41b on the second guide 36. In aspects of the disclosure, a portion of the clamping jaw slides 40a, 40b; 41a, 41b encompasses a projection of the guides 35, 36, so that the clamping jaw slides 40a, 40b; 41a, 41b partially rest on this projection.

Figure 4B:
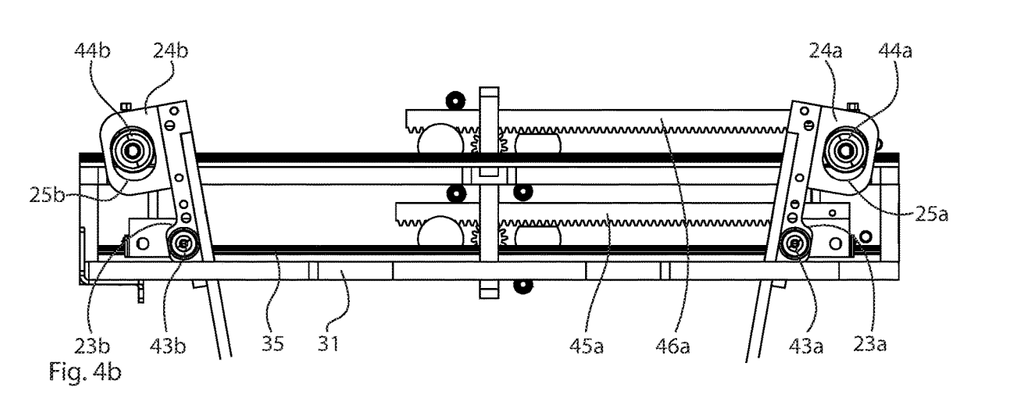
FIG. 4b is a bottom view of the movement mechanism of FIG. 4a, according to aspects of the disclosure.

In FIGS. 4a and 4b, it can be seen that the clamping jaw slides 40a, 40b; 41a, 41b are provided with drive elements 45a, 45b; 46a, 46b, here shown as toothed racks. The drive elements 45a, 45b assigned to the first guide 35 or the corresponding first clamping jaw slide 40a, 40b and the corresponding drive elements 46a, 46b assigned to the second guide 36 are oriented with respect to the toothed elements of the toothed racks in such a way that the toothed elements lie opposite one another and the free ends thereof form an overlap region. A drive gear 55, 56 is arranged in the center in the overlap region of the drive elements 45a, 45b; 46a, 46b (e.g., toothed racks), which drive gear 55, 56 is coupled to a drive 51, 52 via a gear 53, 54 (not shown in FIGS. 4a and 4b). The distance between the clamping jaw slides 40a, 40b; 41a, 41b of a guide 35, 36 and the corresponding drive gear 55, 56 is identical. A drive gear 55, 56 is therefore arranged exactly in the middle between two clamping jaw slides 40a, 40b; 41a, 41b, so that movement of the drive gear 55, 56 causes synchronous movements of the clamping jaw slide 40a, 40b; 41a, 41b. When the drive gear 55, 56 is rotated, the clamping jaw slides 40a, 40b; 41a, 41b are therefore moved synchronously towards one another or away from one another, and the same applies to the clamping jaw slides 40a, 40b; 41a, 41b assigned to the two guides 35, 36.

The clamping jaw slides 40a, 40b of the first guide 35 can therefore be moved simultaneously or separately with respect to the clamping jaw slides 41a, 41b of the second guide 36, so that there is great flexibility with regard to the movement of the clamping jaw slides 40a, 40b; 41a, 41b. The clamping jaw slides 40a, 40b; 41a, 41b of the first or second guide 35, 36 can be moved synchronously, or only the clamping jaw slides 40a, 40b; 41a, 41b assigned to the first guide 35 or the second guide 36 can be moved. In this way, it is possible to move the clamping jaws 20a, 20b fastened to the clamping jaw slides 40a, 40b; 41a, 41b parallel or already pivoted simultaneously without angular adjustment (e.g., by moving the clamping jaw slides 40a, 40b; 41a, 41b of both guides 35, 36 simultaneously), or, if only the clamping jaw slides 40a, 40b; 41a, 41b of one guide 35, 36 are moved, to pivot the clamping jaws 20a, 20b.

As already stated, the clamping jaws 20a, 20b are coupled to the clamping jaw guide arrangement 30. This coupling can be seen in FIG. 4b. In aspects of the disclosure, the clamping jaws 20a, 20b are each connected via a rotary joint 23a, 43a; 23b, 43b to the clamping jaw slides 40a, 40b of the first guide 35 and are each connected via a slot guide 24a, 25a, 44a; 24b, 25b, 44b to the clamping jaw slides 41a, 41b of the second guide 36. In one or more embodiments, the rotary joint 23a, 43a; 23b, 43b can be arranged in the clamping jaw slides 41a, 41b assigned to the second guide 36, where in this case, in the combination shown, it is then necessary for the slot guides 24a, 25a, 44a; 24b, 25b, 44b to be arranged in the clamping jaw slides 40a, 40b assigned to the first guide 35.

However, it is not essential to use the rotary joint/slot guide combination. Although the clamping jaws 20a, 20b have to be held on the corresponding clamping jaw slide 40a, 40b; 41a, 41b in at least one guide by means of a rotary or pivoting joint, the use of a slot guide 24a, 25a, 44a; 24b, 25b, 44b is not absolutely necessary. For example, it is conceivable that the clamping jaws 20a, 20b in one or more embodiments are moved with the clamping jaw slides 40a, 40b; 41a, 41b against a restoring force, and when the clamping jaw slides 40a, 40b; 41a, 41b are retracted, the restoring force moves the clamping jaws 20a, 20b back.

Figure 5A:
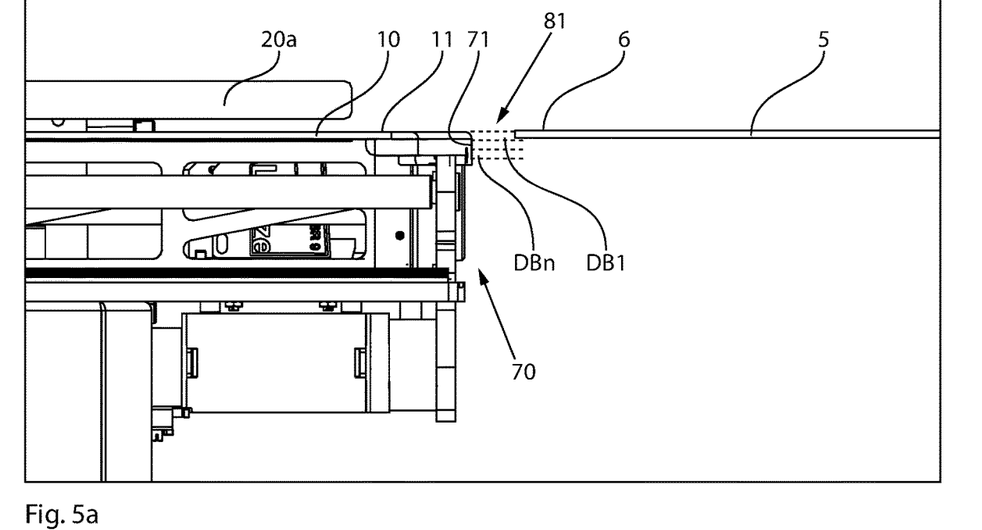
FIG. 5a is a side view of an alignment of a gripper on a non-deflected shelf, according to aspects of the disclosure.
Figure 5B:
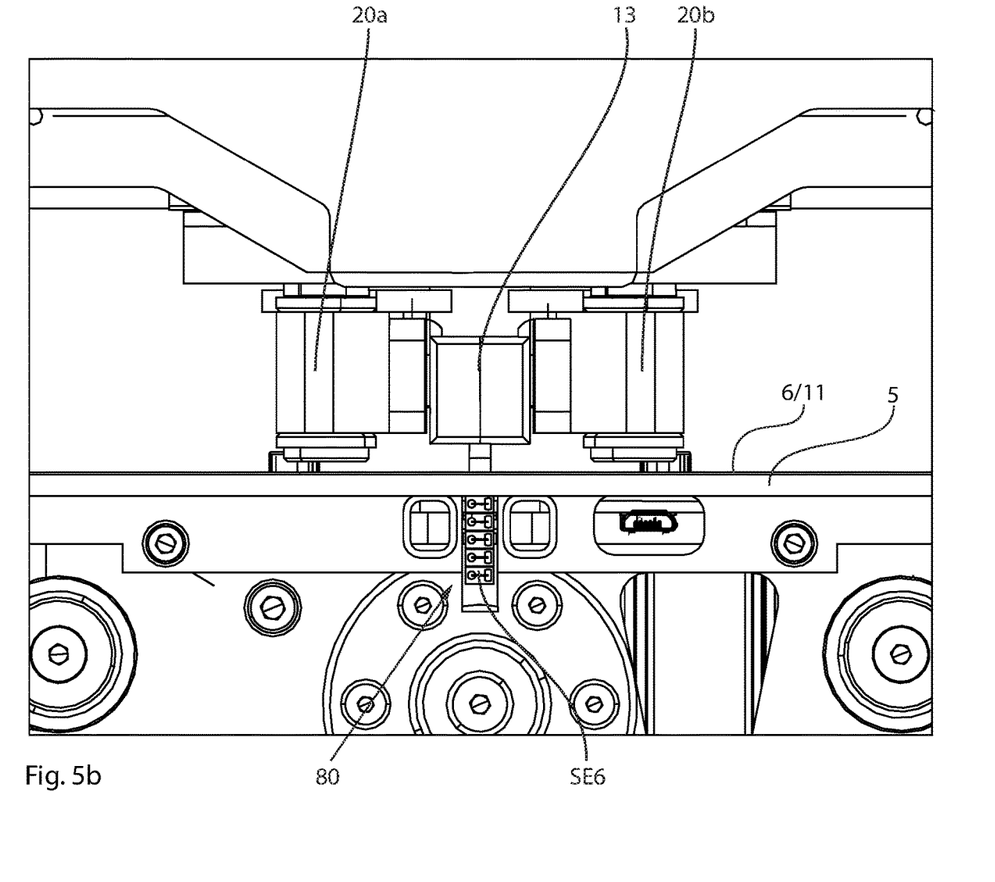
FIG. 5b is a front view of the alignment of the gripper on the non-deflected shelf, according to aspects of the disclosure.

FIGS. 5a and 5b illustrate the alignment of the gripper 1 on a shelf 5 that is not deflected, with FIG. 5a showing a side view and FIG. 5b showing a front view. As can be seen in FIG. 5a, a support surface 6 of a shelf 5 is "appropriately" aligned on the support surface 11 of the drop table 10 so that a small piece good can be moved from or onto the shelf 5 without any problems. In aspects of the disclosure, the shelf 5 only extends into a detection region DB1, which is interpreted when determining the alignment that no readjustment of the gripper 1 with regard to the Z axis or Z direction (e.g., vertical axis) is necessary. A corresponding front view is shown in FIG. 5b, the gripper 1 being viewed from "behind" the shelf 5. It can be seen that the support surfaces 6 and 11 of the shelf 5 and the support table 10 are aligned with one another or are in substantially the same Z position.

Figure 6A:
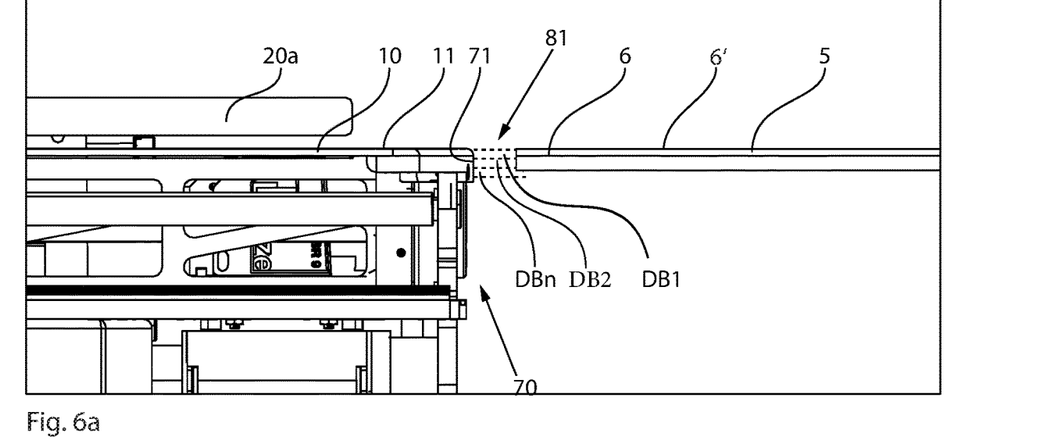
FIG. 6a is a side view of an alignment of a gripper on a deflected shelf, according to aspects of the disclosure.
Figure 6B:
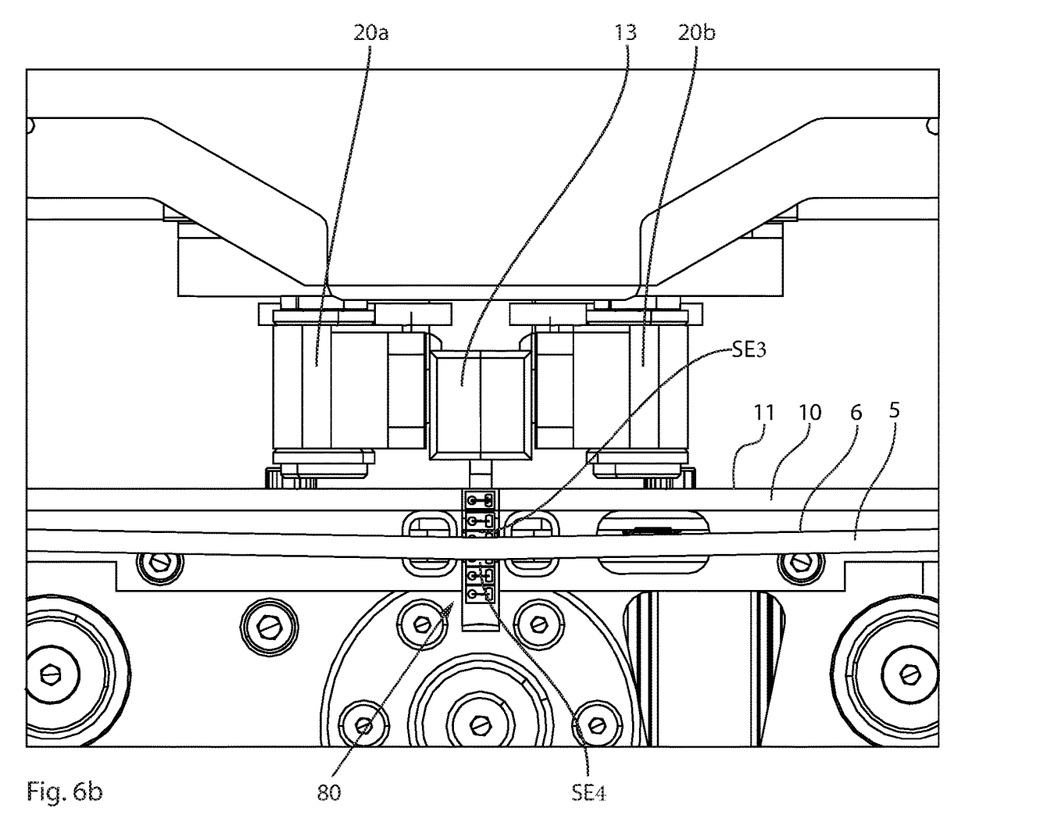
FIG. 6b is a front view of the alignment of the gripper on the deflected shelf, according to aspects of the disclosure.

This is different in the situation shown in FIGS. 6a and 6b, where the shelf 5 is deflected. The shelf 5 in the detection regions DB1-DBn (e.g., detection area 81) is not only recognized in the detection region DB1, but also in a detection region DB2 (see FIG. 6a), which indicates a deflection and a need to correct the Z position of the gripper 1. In the front view according to FIG. 6b, what is shown schematically in FIG. 6a is repeated, but it is possible to see more precisely how a deflection has an effect. Here, the support surface 6 of the shelf 5 is no longer aligned with the support surface 11 of the drop table 10, but is arranged in the region in front of the sensor units SE3 and SE4. An evaluation of the sensor units SE1-SE6/detection regions DB1-DBn shows in this case that the gripper 1 has to be moved "down" in the Z direction approximately by an amount, which corresponds to the height of two detection regions DB1-DBn for dispensing a small piece good onto the drop table 10.

Figure 7A:
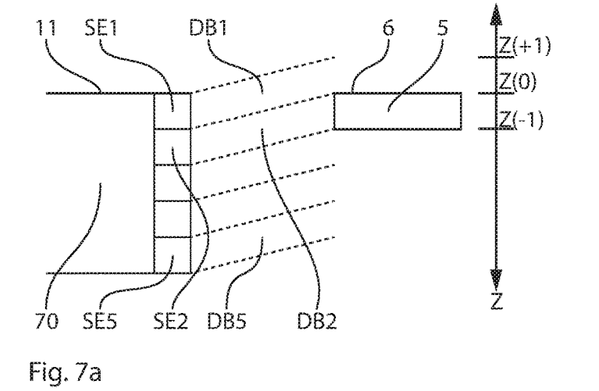
FIGS. 7a-7c schematically show different storage and dispensing scenarios, according to aspects of the disclosure.
Figure 7B:
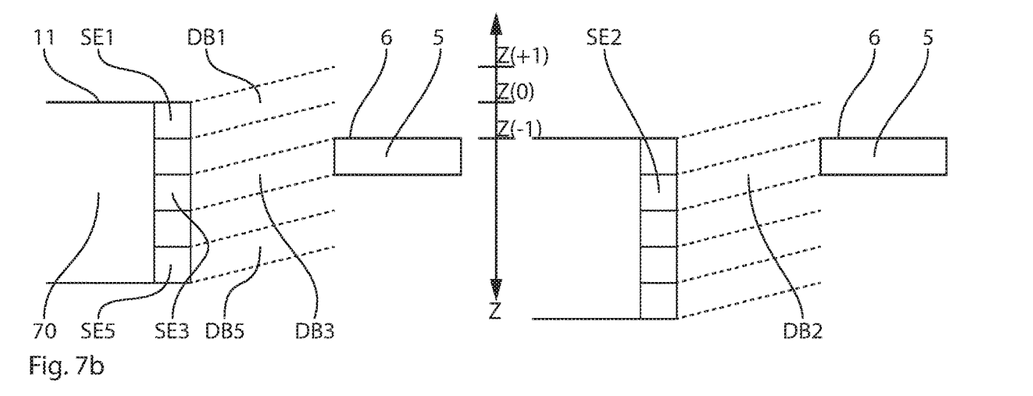
Figure 7C:
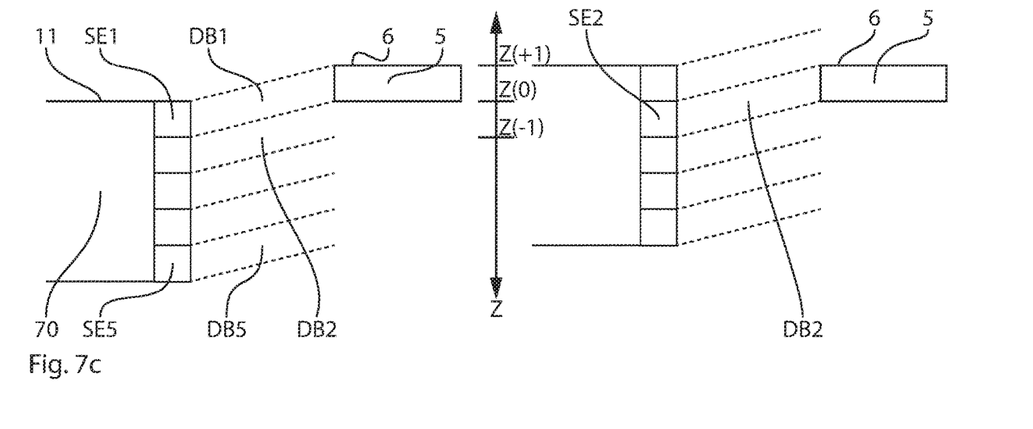

FIGS. 7a-7c schematically illustrate different storage and dispensing scenarios. The gripper 1, schematically indicated in portions in FIGS. 7a-7c, comprises five sensor units SE1-SE5 with corresponding detection regions DB1-DB5, the sensor units SE1-SE5 being aligned in such a way that the detection regions DB1-DB5 do not run parallel to the support surface 11, but rather rise slightly. This means that the detection region DB1 covers a region above the support surface 11. In the scenario in FIG. 7a, the shelf 5 is not deflected, so the gripper 1 is ideally aligned with the shelf 5. Due to the alignment of the detection regions DB1-DB5, this means that the shelf 5 is only recognized in the detection region DB2. When determining the alignment, this is recognized as "no deviation" and requires a corresponding specification of a control unit. In aspects of the disclosure, this can also indicate a deflection.

In FIG. 7b there is a deflection, where after moving the gripper 1 to the target position, it is not ideally aligned with the shelf 5, which is recognized by the fact that the shelf 5 is determined in the detection region DB3, which means a negative deviation from the target position. As a result, the gripper 1 is moved from the target position Z(0) to the adjusted Z position Z(−1). As soon as the gripper 1 has arrived in this Z position, the shelf 5 is recognized again in the detection region DB2, where the alignment is therefore ideal, and a small piece good can be dispensed.

FIG. 7c shows a scenario in which the target position was adjusted after recognizing a deflection (e.g., in response to the scenario according to FIG. 7b). When determining the alignment, it is detected that the shelf 5 is recognized in the detection region DB1, which means that the Z position of the gripper 1 is less than that of the shelf 5, for example because the last dispensing action removed so much weight that the deflection decreased. If this is determined, the gripper 1 is moved from position Z(0) to position Z(+1) and this new Z position is saved as the new target position of the gripper 1 for the shelf 5 in question.

Figure 8:
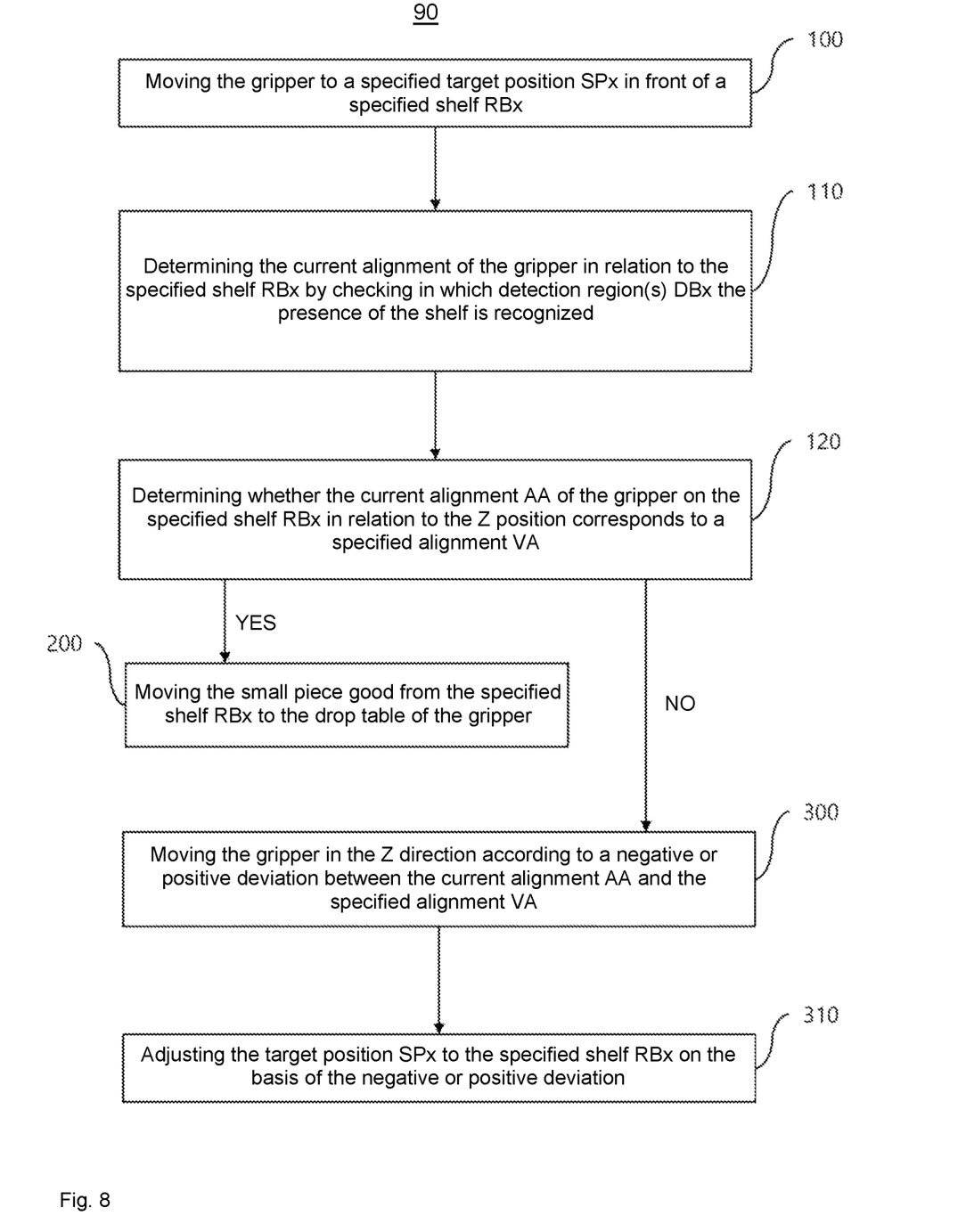
FIG. 8 is a flow chart of a method of operating a gripper, according to aspects of the disclosure.

FIG. 8 shows a flow chart of one or more embodiments of a method 90 according to the disclosure. First, in a step 100, the gripper (e.g., gripper 1) is moved to a specified target position SPx in front of a specified shelf RBx. On this specified shelf RBx, a small piece good is arranged which is to be dispensed, for which purpose it must first be moved onto the drop table (e.g., drop table 10) of the gripper. The shelf on which the small piece good is arranged is determined on the basis of a query of a database. As soon as the shelf in question has been determined, the current target position thereof is determined and the gripper is moved.

As soon as the gripper has reached the target position, in a step 110, the current alignment of the gripper in relation to the specified shelf RBx is determined by checking in which detection region(s) DBx the presence of the shelf is recognized (see disclosure relating to FIGS. 7a-7c). In a step 120, it is then determined whether the current alignment of the gripper on the specified shelf RBx in relation to the Z position corresponds to a specified alignment (see also FIGS. 7a-7c). If this is the case (e.g., if there is no deflection or the target position is adjusted to the deflection), the small piece good is moved in a step 200 onto the drop table of the gripper. How exactly this happens depends on the exact design of the transport device of the gripper, which is, however, not substantial to the disclosure.

If this is not the case (e.g., there is a deflection or the deflection has decreased and the target position has not been adjusted, the gripper is moved in a step 300 in the Z direction according to a negative or positive deviation between the current alignment AA and the specified alignment VA and is subsequently dispensed (e.g., step 200). Finally, in a step 310, the target position SPx is adjusted to the specified shelf RBx on the basis of the negative or positive deviation.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed:

1. A gripper for a picking device having horizontal shelves for storing small piece goods, the gripper comprising:
    a drop table extending in a first horizontal direction and a second horizontal direction orthogonal to the first horizontal direction, the drop table comprising an end portion having a dispensing end face, wherein the drop table and the end portion define an upper support surface;
    a transport device arranged above the drop table and movable in the first horizontal direction, the transport device configured for moving small piece goods from a horizontal shelf to the drop table;
    a control device; and
    a sensor device coupled to the control device, the sensor device arranged in the end portion, the end portion having a plurality of detection regions associated therewith, wherein the sensor device is arranged along a vertical axis in such a way that the plurality of detection regions cover a vertically extending space in front of the dispensing end face, and wherein the control device is configured to determine the alignment of the gripper on a horizontal shelf by evaluating the sensor device.

2. The gripper of claim 1, wherein the transport device comprises two elongated gripping jaws arranged above the drop table and extending in the first horizontal direction, the two elongated gripping having inner surfaces facing each other.

3. The gripper of claim 2, wherein at least one of the elongated gripping jaws is movable at least in portions in the second horizontal direction.

4. The gripper of claim 2, further comprising a clamping jaw guide arrangement, wherein the elongated gripping jaws are coupled to the clamping jaw guide arrangement.

5. The gripper of claim 4, wherein the elongated gripping jaws are each coupled via a rotary joint to a clamping jaw slide of a first guide.

6. The gripper of claim 5, wherein the elongated gripping jaws are each coupled via a slot guide to a clamping jaw slide of a second guide.

7. The gripper of claim 2, wherein the elongated gripping jaws are each coupled to a retractable clamping jaw slide having a restoring force, wherein the restoring force is configured to move the elongated gripping jaw back to a specific position.

8. The gripper of claim 1, wherein the sensor device comprises a sensor assembly that is releasable from the drop table.

9. The gripper of claim 1, wherein the sensor device is arranged centrally in the end portion in relation to the vertical direction.

10. The gripper of claim 1, wherein the sensor device is arranged such that at least one of the plurality of detection regions extends vertically over the support surface.

11. The gripper of claim 1, wherein the sensor device comprises a plurality of sensor units.

12. The gripper of claim 11, wherein the number of sensor units is the same as the number of detection regions.

13. A method for operating a picking device, the method comprising:

moving a gripper to a specified target position in front of a specified shelf of a plurality of horizontal shelves, the gripper comprising:

a transport device for storing and dispensing small piece goods on or from the shelves;

a drop table extending in a first horizontal direction and a second horizontal direction orthogonal to the first horizontal direction and having at least one end portion with a dispensing end face, the drop table and the end portion defining an upper support surface; and at least one sensor device coupled to a control device and arranged in the at least one end portion having detection regions associated therewith, wherein the sensor device is arranged in such a way that the detection regions cover a vertically extending space in front of the dispensing end face;

determining a current alignment of the gripper in relation to the specified shelf by checking in which detection regions the presence of the shelf is recognized;

determining whether the current alignment of the gripper on the specified shelf in relation to a vertical position corresponds to a specified alignment; and moving the gripper in a vertical direction according to a negative or positive deviation between the current alignment and the specified alignment when the current alignment is determined not to be in the specified alignment.

14. The method of claim 13, further comprising:
wherein if there is a deviation between the current alignment and the specified alignment, adjusting the target position to a specified shelf on the basis of the deviation.

15. The method of claim 14, further comprising:
wherein if there is a negative deviation between the current alignment and the specified alignment, marking the specified shelf as the shelf to be relocated.

16. The method of claim 13, further comprising:
wherein if there is a deviation between the current alignment and the specified alignment, adjusting a maximum storage height of a shelf below the specified shelf based on the deviation.

17. The method of claim 13, further comprising:
wherein if there is a deviation between the current alignment and the specified alignment, traversing the entire specified shelf with the gripper in the vertical direction.

18. The method of claim 17, further comprising:
for all storage locations assigned to the specified shelf, adjusting the target positions assigned to the storage locations accordingly.

19. The method of claim 13, further comprising:
wherein if there is a deviation between the current alignment and the specified alignment,
calculating the deviations for all storage locations on the shelf based on this deviation; and
adjusting the target positions assigned to the storage locations accordingly.

20. The method of claim 13, further comprising:
adjusting the maximum storage heights for all storage locations on the shelf below the specified shelf based on the deviations determined between the current alignment and the specified alignment.

* * * * *